United States Patent Office 3,256,785
Patented June 21, 1966

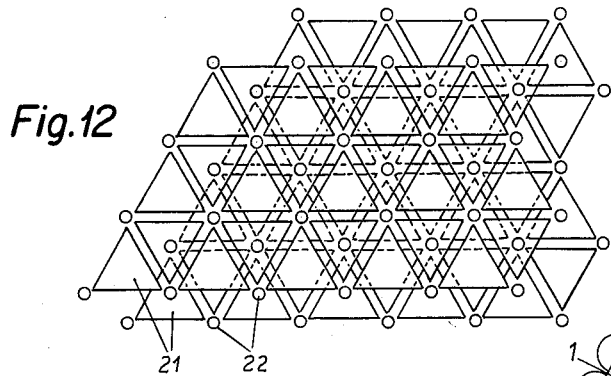
Fig. 12  Fig. 1
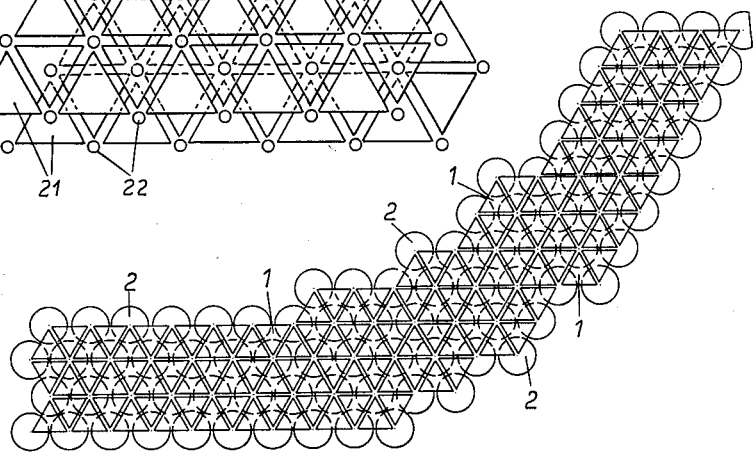
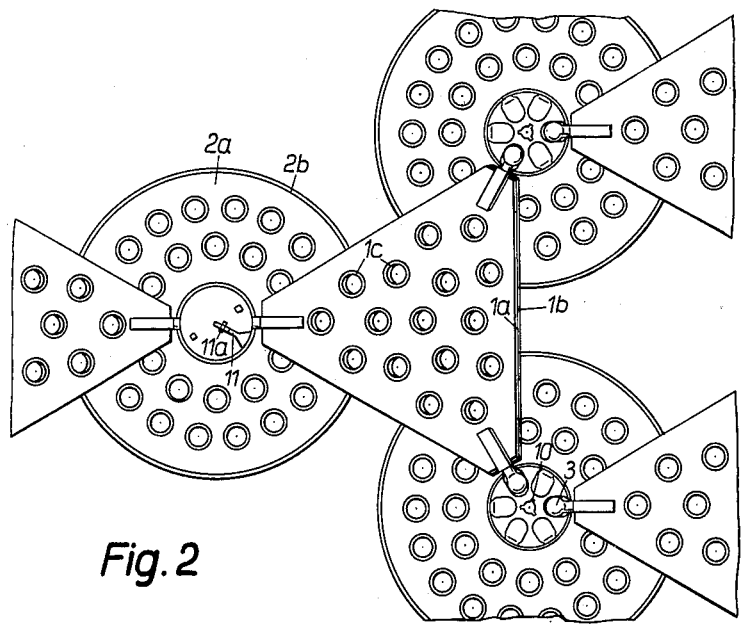
Fig. 2

3,256,785
GROUND COVERING APPARATUS
Fritz Stammbach, Neu-Ulm, Otto Stängl, Coblenz, Otto Voigt and Helmut Andres, Butzbach, Oberhessen, and Kurt Woerfel, Giessen-Wieseck, Germany, assignors to Pintsch Bamag Aktiengesellschaft, Butzbach, Oberhessen, Germany, a German company
Filed Apr. 11, 1963, Ser. No. 272,323
Claims priority, application Germany, Apr. 12, 1962, P 29,175; Jan. 12, 1963, P 30,929
9 Claims. (Cl. 94—13)

The invention relates to a temporary ground covering which is adapted for being placed on the ground to permit the passage of heavy vehicles with tires and caterpillar-track vehicles.

In order to enable such temporarily usable tracks or roadways to be set up quickly, it is known to lay track elements of different shapes and sizes, such as mesh-like fabrics, duckboards and plates on the ground and to interconnect them by suitable means. These ground coverings may be satisfactory for a sandy subsoil hereinafter referred to as "soil type 1," but are unsuccessful over a period, more especially with plastic loam soil and peaty subsoil hereinafter referred to as "soil types 2 and 3." On the latter, the known coverings are forced by heavy vehicles into the subsoil, and some of the track elements are raised and their connecting members are destroyed.

The invention has for its object to provide a ground covering which is able to offer a permanent track to even the heaviest of vehicles on loamy and marshy ground. This object is achieved according to the invention by the use of preferably plate-like elements forming the track lying centrally on the support members serving to transmit the force to the subsoil. It is advantageous in this case for several juxtaposed track plates to be supported at their periphery by each support member.

The effect achieved in this way is that even when the load is applied entirely to one side of the track plates, especially at the instant of driving onto the plates, the force transmission to the subsoil always takes place in the center of the support members, which accordingly distribute the load uniformly to the subsoil and avoid harmful edge pressures.

In one preferred constructional embodiment of the invention, the track plates are mounted on the support members by means of ball and socket joints, the ball gudgeons advantageously being accommodated with such a clearance in the ball sockets that a mutual displacement of the track plates in the plane of the plates is made possible in adition to the change in inclination.

Furthermore, according to another feature of the invention, if provision is made by suitable clearance between the track plates and the supoprt members for a great inclined position of the plates relative to the support members, considerable irregularities in the terrain can also be overcome without any difficulty by using the ground covering according to the invention.

According to the invention, the support members can be made of shallow conical form for this purpose and the articulated mounting of the track plates can be arranged in the apex of the cone, so that the maximum inclination of the track plates is essentially determined by the angle of the cone.

In this connection, the invention provides for round support members which carry ball sockets in the center and triangular track plates with balls at the corners.

In order to simplify such a ground covering as regards manufacture, positioning, loading and handling, the invention also contemplates that the track plates and the support members be constructed as completely idenical plate elements which are uniformly provided in the middle and at the periphery with devices for mutual connection, so that each plate element can be used at will as a track plate or as a support plate in a two-layer ground covering.

The said connecting devices can be formed on the plates either by shaping or can be fixedly or movably mounted thereon, in such a way that those connecting devices not in use at the time do not obstruct the movement of vehicles and the mutual freedom of movement of the plates.

Other features and advantages of the invention will be apparent from the following description taken in conjunction with the appended drawings, in which the invention is illustrated by reference to constructional embodiment and in which:

FIG. 1 is a plan view of the ground covering for a normal track width with straight sections and a curve;

FIG. 2 is a portion of FIG. 1 to a larger scale;

FIG. 12 shows diagrammatically an arrangement of a two layer covering.

Figure 3:
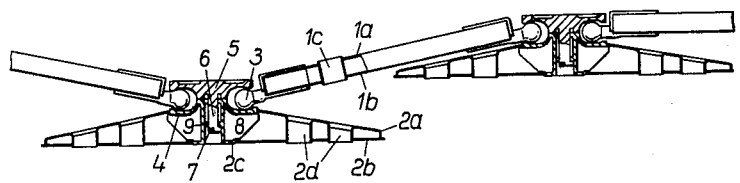
FIG. 3 is a vertical section through two adjacent ground supports of FIG. 2, which are disposed at different heights.

Referring to the embodiment shown in FIGS. 1–3, the ground covering consists of track plates 1 and the form of equilateral triangles in plan view and round support members 2, each support member being able to support six track plates, each at one corner. The diameter of the support members and the side length of the track plates are between one and one and a half metres in one practical construction. It is to be seen from FIG. 1 how straight and curved track sections can be laid with these elements as required.

Each of the track plates 1 is constructed as a hollow element and as shown in FIGS. 2 and 3 comprises a top plate 1a and a bottom plate 1b, which are rigidly interconnected, e.g. by welding. Serving for strengthening purposes are spacer tubes 1c, which are rigidly fixed, e.g. welded, into aligned holes in the top and bottom plates. The tubes 1c protrude a certain extent on both sides of the plates as shown in FIG. 3.

The projection of the tubes form annular ribs which impart an improved grip to the surface, so that wetness or any moist soil components carried onto the track in operation are not able to cause any danger of skidding.

At their corners, the triangular plates are each provided with a ball 3 for the articulated mounting of the plate on the support member. The support members 2, which are also formed as hollow elements, consist of a conical top section 2a, a flat base plate 2b and a middle section 2c, which are rigidly interconnected, e.g. by welding. Tubular webs 2d are again provided for stiffening or strengthening purposes, these webs being fitted into holes in the upper section and the base plate and preferably projecting a certain extent on the underside so that the support members rest in slip-proof manner on the ground.

The middle section 2c carries a bottom shell 4 of a sextuple ball and socket joint, onto which upper shell 5 is fitted. For this purpose, the latter is provided with an axial pin 6 comprising projections 7, while the lower shell has a central cavity 8 with inwardly projecting dogs 9, between which exist grooves 10 (FIG. 2) corresponding to the shape of the projections.

The projections 7 and dogs 9 serve for the locking of the two shells, in that after guiding the projections 7 through the grooves 10, the projections 7 can be moved behind the dogs 9 by effecting a short rotational movement of the pin or upper shell and thus the pin or gudgeon is locked in the axial direction. In this locked position, the upper shell can be secured by a latch (not shown). When laying the ground covering which has been above described, the support members are placed on the ground in some cases by means of a spacing gauge or template and the track plates are engaged in the lower shells of the support members, whereafter the top shells are fitted on the lower shells, and locked against axial movement by rotation and secured by hinging down the latch. As soon as the first support members are positioned, it is already possible to start the laying of the track plates, so that progressive working is assured.

Certain differences in height or inclined positions and differences in spacing of the support members are made possible by the conical form of the support members and by the radial play in the ball and socket joints, as can be seen from FIG. 3.

By the driving of pegs or the like through the tubular webs 2d in the holes in the support members and into the ground, the ground covering as a whole can be anchored to the ground. Preferably, the pegs are driven through the tubular webs in the outer sections of the support members.

Figure 4:
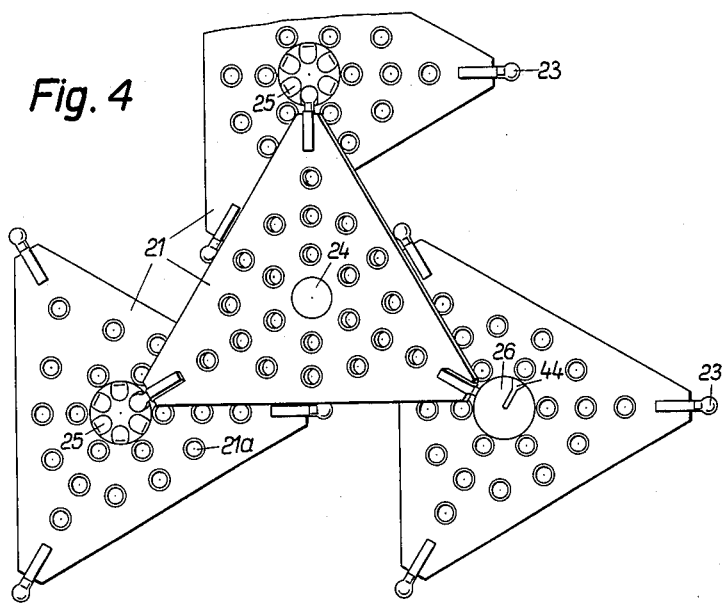
FIGS. 4 and 5 show modified versions of the embodiments shown in FIGS. 1 and 2.
Figure 5:
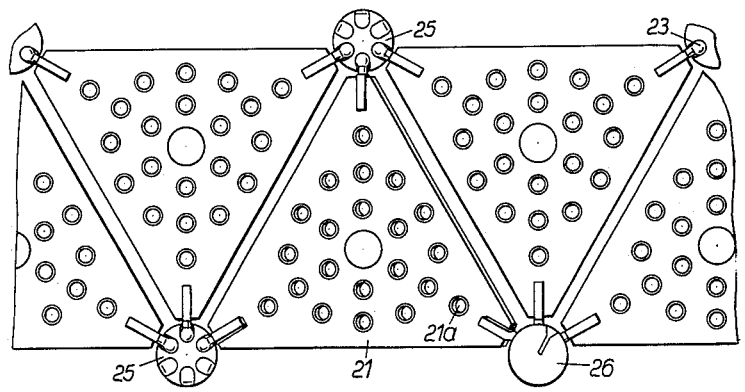
Figure 6:
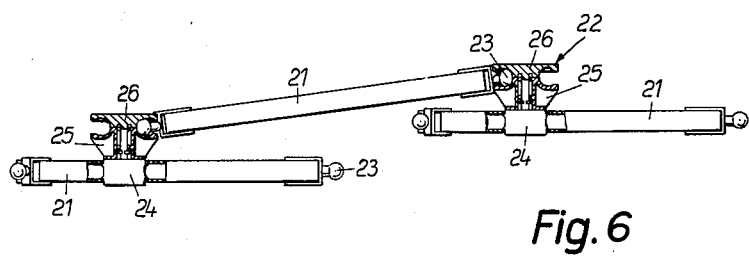
FIGS. 6 and 7 are vertical sections through the ground covering according to FIGS. 5 and 6, respectively.
Figure 7:
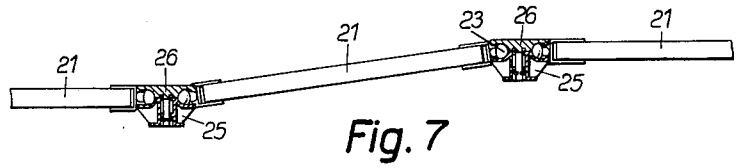

In the constructional examples illustrated in FIGS. 6 to 12, the ground covering consists of plates 21 in the form of equilateral triangles. The plates 21 are constructed as flat hollow elements which are stiffened or strengthened by fitted, e.g. welded spacer tubes 21a (FIGS. 4, 5). As a connecting device, each plate comprises at each corner a ball gudgeon and in the middle one or more insert pieces, which are indicated diagrammatically in FIGS. 4 to 7 by a circle or cylinder 24.

In order to facilitate or render possible the use of the plates on both sides, the ball gudgeons are in the mean plane of the plates and the insert pieces are constructed to extend through from one side of the plate to the other and not project any appreciable degree beyond the plate surface so that substantially a symmetrical construction is formed. A certain projection of the insert pieces such as the spacer tubes is permissible and desirable in order to obviate the danger of slipping.

The insert pieces permit the anchoring of a separate intermediate member 22, consisting of a lower part 25 and an upper part 26, which in turn is able to accommodate the ball gudgeons 23 of the coresponding track plates 21. These insert pieces or elements which are rigidly fitted, e.g. welded, in the plates can for example be provided as follows.

Figure 8A:
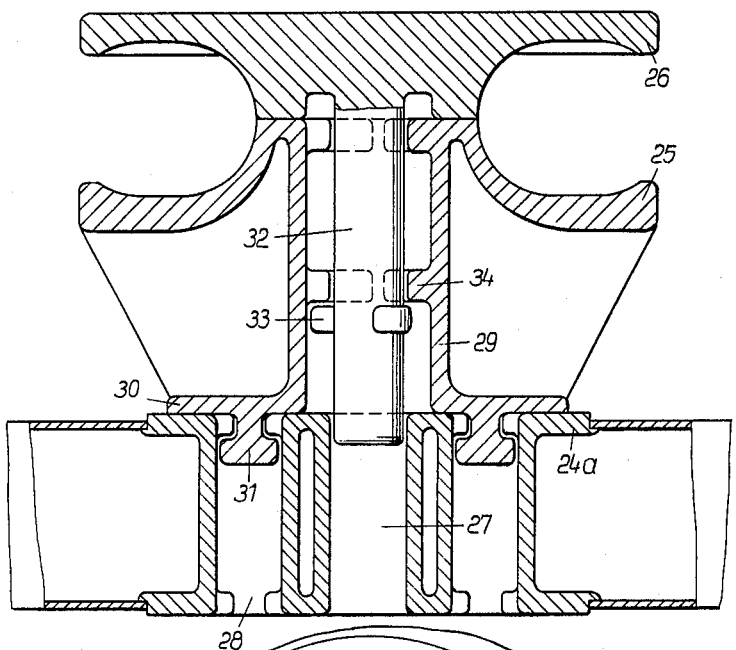
FIGS. 8–11 are views of several embodiments each in section and plan showing insert elements and intermediate elements.
Figure 8B:
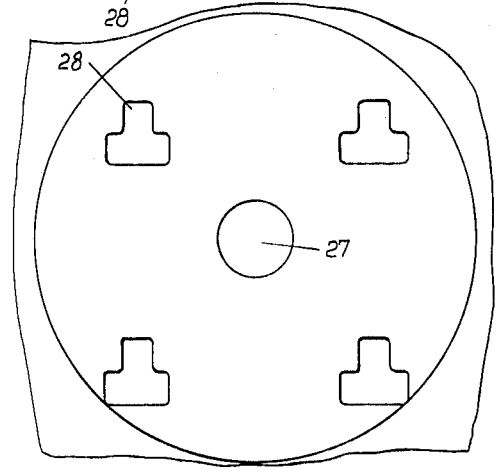

In FIGS. 8a and 8b, an insert member 24a is provided, which comprises an open central bore 27 and around the latter and on each end face four T-shaped slots 28.

The intermediate member consists essentially of a bottom shell 25 and an upper shell 26, which jointly form six ball sockets for accommodating with longitudinal play six ball gudgeons, so that the track plates can undergo a certain mutual displacement in operation. Moreover, in order to permit a mutual inclination of the track plates by maintaining a spacing between the ball gudgeons of the track plates and the insert members of the support plates, the bottom part 25 is formed with a suitable neck 29 which terminates in a base plate 30.

In the embodiment of FIG. 8a the base plate 30 of the lower part comprises four T-shaped projections 31, which are introduced into the wider part of the slots 28 and can thereafter be pushed into the narrow part of the slots and are thus able to anchor the base plate on the insert member.

The upper part 26 carries an axial bolt 32 with projections 33, the said bolt being introduced into the neck 29 of the lower part and being adapted to be locked therein by subsequent turning movement by which the projections 33 engage behind corresponding projections 34 inside the neck. Due to the fact that the end of the bolt 32 projects into the central bore 27 of the anchored insert member, the anchoring between insert member 24a and lower part 25 is secured against release.

Figure 9A:
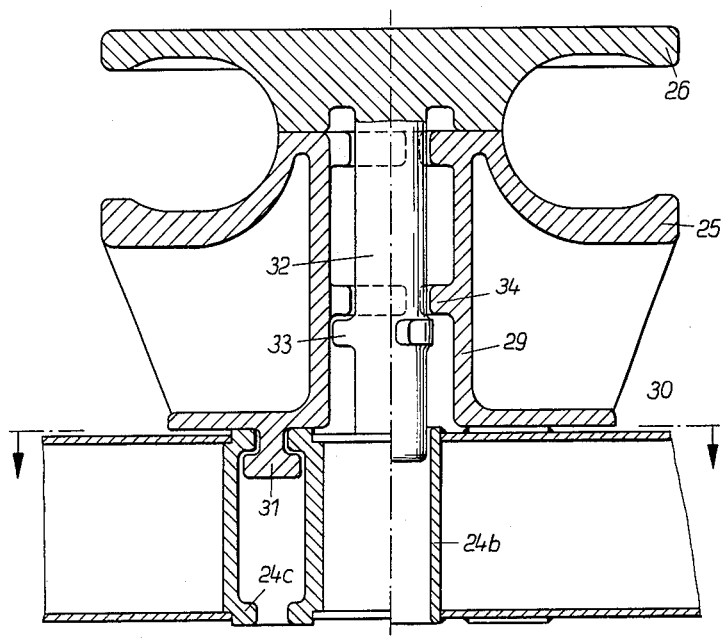
Figure 9B:
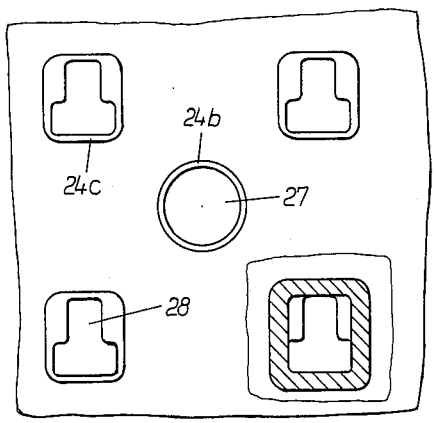

For the purpose of saving weight, five small insert members 24b or 24c are provided in FIGS. 9a and 9b, and these members provide the same continuous bore 27 and the same slots 28 on the sides of the plates as in FIG. 8b. The two-part intermediate member 25, 26 corresponds entirely to that of FIG. 8a, also as regards the anchoring and locking thereof.

Figure 10A:
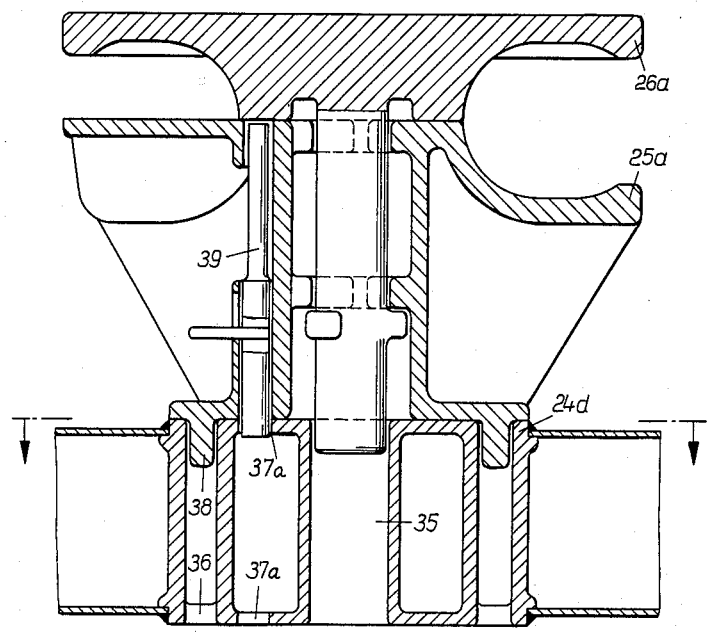
Figure 10B:
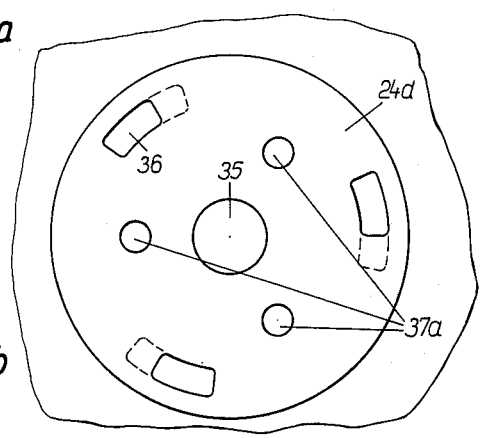

In FIGS. 10a and 10b, the insert member 24d has three concentric slots 36 on each side around a central bore 35 and also an opening 37a or 37b on each side. In corresponding manner, the lower part 25a of the intermediate member, which is substantially similar to that shown in FIGS. 8a and 8b, comprises three L-shaped projections or lugs 38, which are introduced into the slots 36 and, after rotating the intermediate member, cause the anchoring thereof in the insert member 24d. In addition, a pin 39 is guided in the intermediate member and after the latter has been turned, the pin drops into the hole or bore 37a and thus secures the anchored engagement against release.

Figure 11A:
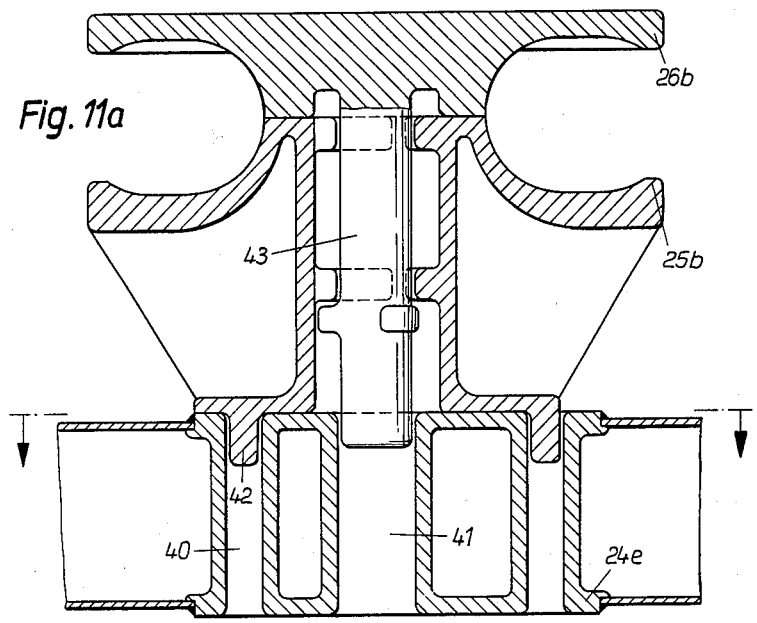
Figure 11B:
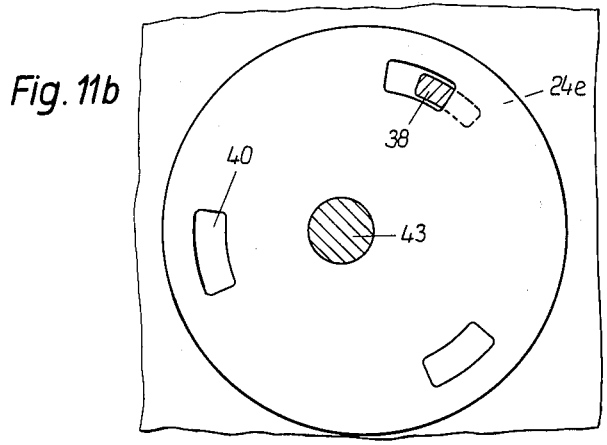

In FIGS. 11a and 11b, the plate has a one piece insert member 24e, which comprises on each side three slots 40 which are concentric in relation to a central bore 41. In corresponding manner, the lower part 25b of the two-part intermediate member comprises three L-shaped lugs 42 and a bolt 43. In this constructional example, however, the central bore 41 and the bolt 43 are arranged somewhat eccentrically in relation to the center, namely, in such a way that after the fitted intermediate member has been rotated, that is to say, in the anchored position of the latter, the said bore and bolt come into registry so that once again the intermediate member is locked against release by the insertion of the bolt.

The upper part of the intermediate member, which is locked in similar manner in all the constructional forms described above by means of the projections 33 and 34 by a turning movement, can be secured in this locked position in known manner by a latch (not shown).

The construction of the ground covering according to the invention permits a two layer method of laying according to FIG. 12, in which the bottom layer of plates is composed in the same way as the upper layer of closely juxtaposed plates, in which always six plates are coupled at a corner by a connecting member which extends into the ground at its lower end in exactly the same way as when laying with a single layer. It is true that the articulated nature of the ground covering is restricted in this way, but on the other hand the rigidity thereof is increased to an exceptional degree.

It is also possible in the ground covering according to FIG. 12 for the track plates at the approach end (on the left in FIG. 12) to rest at one end directly on the ground and thus form a driving-on ramp.

What is claimed is:

1. Apparatus adapted for being placed directly on subsoil to enable passage thereover, said apparatus comprising a plurality of plates each of polygonal shape including corner portions, and support, means for supporting a plurality of plates at the corner portions thereof, said support means being placed directly on the subsoil, said plates including ball members at said corner portions lying substantially in the plane of the respective plates, said support means comprising a two shell support member including a plurality of sockets for the rotatable accommodation of ball members at the corner portions of the plates, and means for detachably locking the upper and lower shells together with the ball members of the plates rotatably accommodated therein.

2. Apparatus as claimed in claim 1 wherein said sockets are larger than the ball members and the latter have play in said sockets.

3. Apparatus as claimed in claim 1 wherein said support means includes a support plate with a central opening the lower shell being inserted in the opening in the support plate, the upper shell being on the lower shell and substantially at the level of the associated plates of polygonal shape.

4. Apparatus as claimed in claim 3 wherein said means for locking the shells together comprises means for locking the upper shell in centered position on the lower shell.

5. Apparatus as claimed in claim 1 wherein the plates are constituted as hollow bodies of sheet metal members with stiffening webs.

6. Apparatus as claimed in claim 5 wherein said webs are tubes, said sheet members having aligned holes, the tubes being fitted into the holes of the sheet metal members and projecting at least at one end beyond the sheet members.

7. Apparatus as claimed in claim 3 wherein the polygonal plates and the support plate are identical and each include said ball members at the corners.

8. Apparatus as claimed in claim 7 comprising a separate intermediate member adapted for being inserted into one of the plates for accommodating the support member which permits the plates to be selectively laid in two layers and as a single layer at will.

9. Apparatus as claimed in claim 8 wherein the lower shell includes lugs which are engageable in corresponding openings in said intermediate members.

References Cited by the Examiner

UNITED STATES PATENTS

| 791,017 | 5/1905 | Farmer | 94—5 |
| 2,025,815 | 12/1935 | Horridge | 94—13 |
| 2,421,171 | 5/1947 | Trautvetter | 94—5 |
| 2,531,892 | 11/1950 | Reese | 287—21 |
| 3,096,695 | 7/1963 | Reinhart | 94—11 |

FOREIGN PATENTS

| 267,832 | 3/1927 | Great Britain. |
| 312,293 | 5/1929 | Great Britain. |
| 410,404 | 5/1934 | Great Britain. |
| 1,134,770 | 12/1956 | France. |
| 35,744 | 6/1935 | Holland. |

JACOB L. NACKENOFF, *Primary Examiner.*

M. O. WARNECKE, *Assistant Examiner.*